(12) United States Patent
Todeschini

(10) Patent No.: US 9,727,841 B1
(45) Date of Patent: Aug. 8, 2017

(54) SYSTEMS AND METHODS FOR REDUCING PICKING OPERATION ERRORS

(71) Applicant: Vocollect, Inc., Pittsburgh, PA (US)

(72) Inventor: Erik Todeschini, Camillus, NY (US)

(73) Assignee: Vocollect, Inc., Pittsburgh, PA (US)

( * ) Notice: Subject to any disclaimer, the term of this patent is extended or adjusted under 35 U.S.C. 154(b) by 0 days.

(21) Appl. No.: 15/159,937

(22) Filed: May 20, 2016

(51) Int. Cl.
*G06Q 10/08* (2012.01)
*B65G 1/137* (2006.01)
*B65G 1/04* (2006.01)
*G06K 7/14* (2006.01)
*G06K 7/10* (2006.01)

(52) U.S. Cl.
CPC ......... *G06Q 10/087* (2013.01); *B65G 1/0492* (2013.01); *B65G 1/1373* (2013.01); *G06K 7/10366* (2013.01); *G06K 7/1413* (2013.01); *B65G 2209/04* (2013.01)

(58) Field of Classification Search
None
See application file for complete search history.

(56) References Cited

U.S. PATENT DOCUMENTS

| | | | |
|---|---|---|---|
| 6,546,344 B1 | 4/2003 | Rodrian et al. |
| 6,832,725 B2 | 12/2004 | Gardiner et al. |
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |

(Continued)

FOREIGN PATENT DOCUMENTS

| | | |
|---|---|---|
| WO | 2013163789 A1 | 11/2013 |
| WO | 2013173985 A1 | 11/2013 |

(Continued)

OTHER PUBLICATIONS

U.S. Appl. No. 13/367,978, filed Feb. 7, 2012, (Feng et al.); now abandoned.

(Continued)

*Primary Examiner* — Kristy A Haupt
(74) *Attorney, Agent, or Firm* — Additon, Higgins, & Pendleton, P.A.

(57) ABSTRACT

Systems/Methods are provided for reducing picking operation errors. Task instruction is received about an item to be picked. A unique identifier is received for a pick location where the item is located. A unique identifier signal is received from a computing device at the pick location. A sensor thereof is commanded to output a signal in response to detecting unique identifier signal. The outputted signal represents an ambient magnetic field measurement in the sensor's vicinity received and monitored to detect change. Vehicle motion information is received from a motion detector. A notification whether the vehicle is at the correct pick location where item is located or the incorrect pick location is outputted.

20 Claims, 6 Drawing Sheets

(56) References Cited

U.S. PATENT DOCUMENTS

| | | |
|---|---|---|
| 8,390,909 B2 | 3/2013 | Plesko |
| 8,408,464 B2 | 4/2013 | Zhu et al. |
| 8,408,468 B2 | 4/2013 | Van Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,941,485 B1 | 1/2015 | Mendelson |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El Akel et al. |
| 8,978,981 B2 | 3/2015 | Guan |
| 8,978,983 B2 | 3/2015 | Bremer et al. |

(56) References Cited

U.S. PATENT DOCUMENTS

| | | |
|---|---|---|
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2011/0298603 A1 | 12/2011 | King et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0225197 A1 | 8/2013 | McGregor et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |

(56) References Cited

U.S. PATENT DOCUMENTS

| | | |
|---|---|---|
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0153175 A1* | 6/2015 | Skaaksrud ............ H04W 12/06 701/23 |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz, Sr. et al. |
| 2016/0314294 A1 | 10/2016 | Kubler et al. |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 14/277,337 for Multipurpose Optical Reader, filed May 14, 2014 (Jovanovski et 31); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

(56) References Cited

OTHER PUBLICATIONS

U.S. Appl. No. 14/715,916 for Evaluating Image Values filed May 19, 2015 (Ackley); 60 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices from Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/715,672 for Augumented Reality Enabled Hazard Display filed May 19, 2015 (Venkatesha et al.); 35 pages.

U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.

U.S. Appl. No. 14/740,320 for Tactile Switch for a Mobile Electronic Device filed Jun. 16, 2015 (Bamdringa); 38 pages.

U.S. Appl. No. 14/740,373 for Calibrating a Volume Dimensioner filed Jun. 16, 2015 (Ackley et al.); 63 pages.

\* cited by examiner

SYSTEMS AND METHODS FOR REDUCING PICKING OPERATION ERRORS

FIELD

The present invention relates generally to picking operations such as in a warehouse environment, and more particularly relates to systems and methods for reducing picking operation errors.

BACKGROUND

Task management systems and the like involve picking and stocking (collectively "picking") operations. A common error (referred to herein as a "picking operation error" or simply a "picking error) that may occur in a picking operation results from the user (e.g., a warehouse worker) picking an incorrect item because the pick location is incorrect. Such picking errors may occur in any type of picking operation (e.g., pick to voice, pick to light, etc.). For example, in pick to voice operations, users receive instructions by voice and verbally confirm their actions back to a server. Pick to voice operations attempt to reduce such picking errors by requiring the user to read back a confirmation code provided at each pick location to verify that he/she is at the correct pick location to pick the correct item. A pick error may still occur, however, because of confirmation code memorization by the user due to task repetition. For example, the user may fill orders and perform other tasks in the same areas and locations, day after day. Therefore, repetition of the tasks at the same location allows the user to eventually memorize the confirmation codes for frequently-visited pick locations. This may lead the user to speak the confirmation code before they actually arrive at the correct pick location, opening up the opportunity for the incorrect item to be picked from the incorrect location, resulting in the picking error. For example, the user may become distracted while navigating to where the item to be picked is actually located.

Therefore, a need exists for systems and methods for reducing picking operation errors.

SUMMARY

Accordingly, in various embodiments, the present invention embraces a method for reducing picking operation errors. The method comprises receiving a task instruction about an item to be picked during a picking operation. A unique identifier (ID) is received for a pick location where the item to be picked is located. A unique identifier signal representing the unique identifier is detected from a computing device at the pick location. A sensor of the computing device is commanded to output a signal in response to detecting the unique identifier signal. The signal is representative of an ambient magnetic field measurement in a vicinity of the sensor. The signal outputted from the sensor is received. The signal is monitored to detect a change in the ambient magnetic field measurement. Vehicle motion information from a motion detector about a vehicle in the vicinity of the sensor is received. The vehicle is determined to be at a correct pick location comprising the pick location where the item is located or at an incorrect pick location. A notification of whether the vehicle is at the correct pick location or the incorrect pick location is outputted. If the ambient magnetic field measurement indicates a magnetic field disturbance at the pick location where the vehicle is located and the vehicle motion information indicates stoppage of the vehicle thereat, the vehicle is determined to be at the correct pick location. The vehicle is determined to be at the incorrect pick location if the ambient magnetic field measurement does not indicate a magnetic field disturbance at the pick location, if the vehicle motion information indicates movement of the vehicle at the pick location, or both.

A method for reducing picking operation errors is provided, according to various embodiments. The method comprises receiving a signal from a sensor associated with a pick location of a plurality of pick locations. The signal is representative of an ambient magnetic field measurement in a vicinity of the sensor. The signal is monitored to detect a change in the ambient magnetic field measurement. Vehicle motion information from a motion detector about a vehicle in the vicinity of the sensor is received. That the vehicle is at a correct pick location comprising the pick location or an incorrect pick location is determined by correlating the ambient magnetic field measurement with the vehicle motion information. A notification of whether the vehicle is at the correct pick location or the incorrect pick location is outputted.

A system for reducing picking operation errors is provided, according to various embodiments. The system comprises a computing device and a mobile computing device. The computing device is positioned at a respective pick location within an area and configured to transmit a unique identifier signal associated with the respective pick location. The computing device comprises a sensor configured to measure an ambient magnetic field and to output a signal representing an ambient magnetic field measurement from which a magnetic field disruption is configured to be detected. The mobile computing device is in communication with the computing device. The mobile computing device comprises a memory and a program code resident in the memory, a motion detector for sensing vehicle motion information about a vehicle in a vicinity of the sensor, and a processor communicatively coupled to the memory and the motion detector. The processor is configured by at least a portion of the program code to receive a task instruction about a task to be performed at the respective pick location. A unique identifier (ID) for the respective pick location is received. The unique identifier signal representing the unique identifier is detected. The sensor of the computing device is commanded to output the signal in response to detecting the unique identifier signal. The signal is received from the sensor. The signal is monitored to detect a change in the ambient magnetic field measurement. Vehicle motion information from the motion detector is received. Whether the vehicle is at a correct pick location comprising the respective pick location where a task is to be performed or an incorrect pick location is determined by correlating the ambient magnetic field measurement with the vehicle motion information. If the ambient magnetic field measurement indicates the magnetic field disturbance at the respective pick location and the vehicle motion information indicates stoppage of the vehicle thereat, the respective pick location is determined to be the correct pick location. A notification of whether the vehicle is at the correct pick location or the incorrect pick location is outputted.

The foregoing illustrative summary, as well as other exemplary objectives and/or advantages of the present, and the manner in which the same are accomplished, are further explained within the following detailed description and its accompanying drawings.

DETAILED DESCRIPTION

Various embodiments are directed to systems and methods for reducing picking operation errors (referred to herein as simply a "picking error"). As noted previously, a picking error may occur when an incorrect item is picked from an incorrect pick location within an area such as a warehouse or other indoor or outer facility where picking operations are performed. A vehicle may be used to help perform the picking operation as herein described. Various embodiments utilize the presence of the vehicle to cause a magnetic field disruption to verify a correct pick location. Thus, various embodiments utilize vehicle location information for reducing picking errors. In various embodiments, a motion detector further verifies that the magnetic field disruption is caused by the vehicle that is stopped at the correct pick location and not another vehicle that may be traveling past the correct pick location. As a result, various embodiments substantially ensure that the correct item is picked.

Various embodiments may improve the accuracy of picking operations (by reducing picking errors). For example, "picking" operations may be used to fill orders and perform other tasks in accordance with a task management system. A set of user tasks may involve defining a particular task or order, for example, filling a load for a particular truck scheduled to depart from a warehouse, picking an item from a pick location, etc. As used herein, the "picking operation" may be a pick to voice operation, a pick to light operation, etc. Tasks in which a picking operation may be performed include, without limitation, order fulfillment, goods receiving, pallet put-away and let-down, put-to-store, line-loading, replenishment, back-stocking, transfers, packing, shipping, cycle-counting, auditing, stock checking operations, etc. Accurate picking is valuable in many applications that include, but are not limited to: manufacturing (e.g., tracking an article or a collection of articles through a manufacturing process), warehousing (e.g., determining the location of one or more items), merchandising (e.g., finding consumer items in a retail environment or shopping mall), security (e.g., finding an escape route from a building), or the like. As used herein, the term "pick" and variations thereof refers to picking, stocking, placing, or other tasks and operations that require performance of the task at a correct pick location (e.g., that a correct item be picked at a correct pick location).

Figure 1:
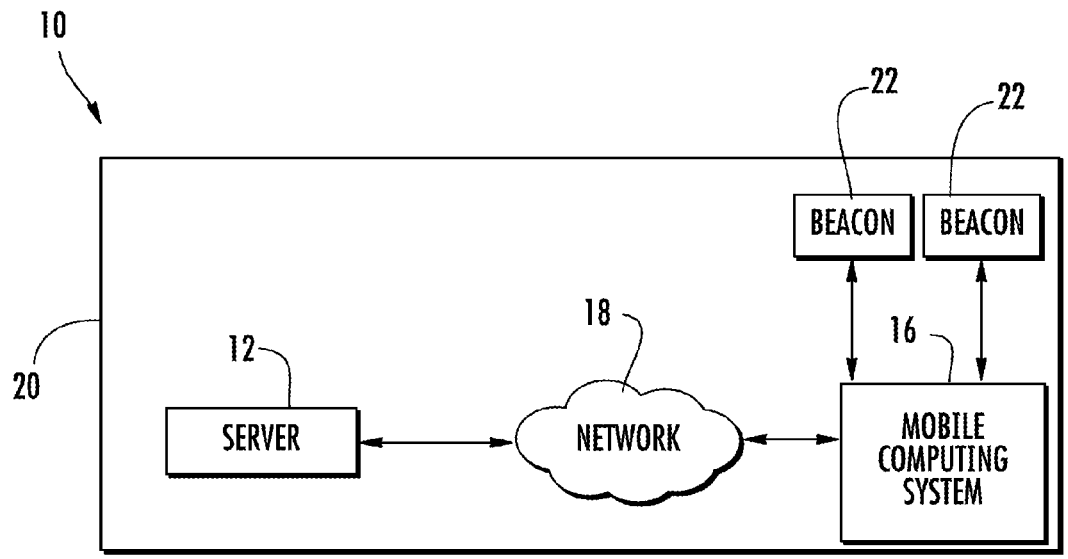
FIG. 1 is a simplified block diagram of a system for reducing picking operation errors, according to various embodiments.

Referring now to FIG. 1, according to various embodiments, a system 10 for reducing picking operation errors is illustrated and includes a server 12 and a mobile computing system 16 that are configured to communicate through at least one communications network 18. The communications network 18 may include any collection of computers or communication devices interconnected by communication channels. The communication channels may be wired or wireless. Examples of such communication networks 18 include, without limitation, local area networks (LAN), the internet, and cellular networks. According to various embodiments, as hereinafter described, the mobile computing system 16 (more particularly, a mobile computing device 70 thereof) is in communication with a plurality of location beacons 22 positioned at respective pick locations within an area (for example, a warehouse 20). While two location beacons 22 are depicted in FIG. 1, it is to be understood that greater than two location beacons may be positioned at respective pick locations within the area. The number of location beacons 22 may correspond to the number of respective pick locations.

Figure 2:
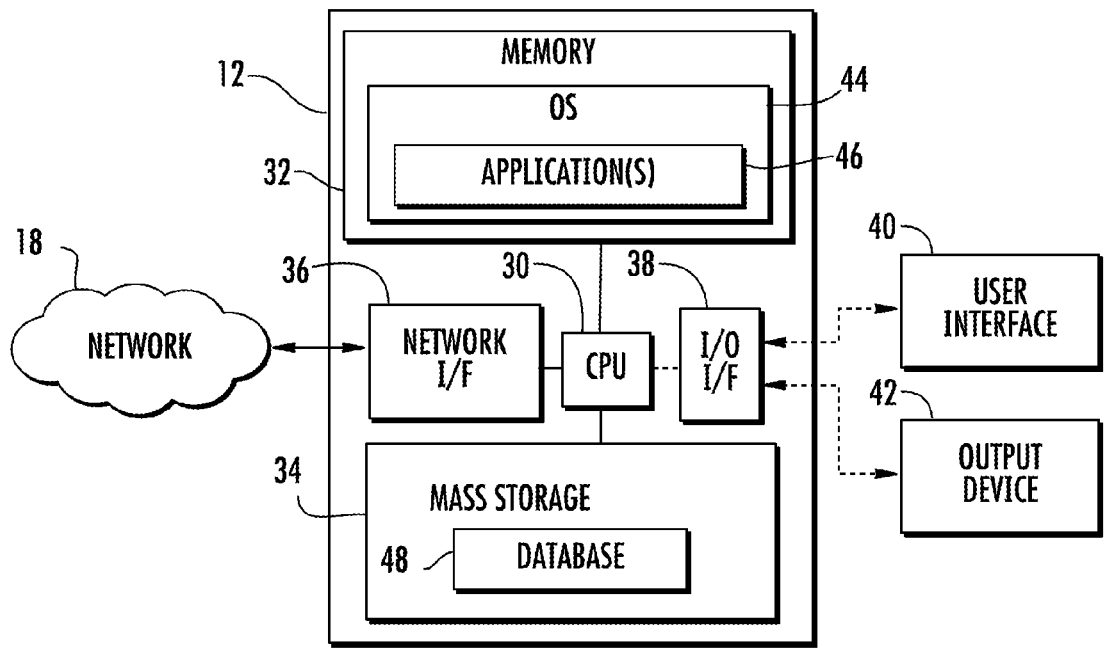
FIG. 2 is a diagrammatic illustration of hardware and software components of a server of the system of FIG. 1, according to various embodiments.

FIG. 2 is a diagrammatic illustration of the hardware and software components of the server 12 of system 10 according to various embodiments of the present invention. The server 12 may be a computing system, such as a computer, computing device, disk array, or programmable device, including a handheld computing device, a networked device (including a computer in a cluster configuration), a mobile telecommunications device, a video game console (or other gaming system), etc. As such, the server 12 may operate as a multi-user computer or a single-user computer. The server 12 includes at least one central processing unit (CPU) 30 coupled to a memory 32. Each CPU 30 is typically implemented in hardware using circuit logic disposed on one or more physical integrated circuit devices or chips and may be one or more microprocessors, micro-controllers, FPGAs, or ASICs. Memory 32 may include RAM, DRAM, SRAM, flash memory, and/or another digital storage medium, and also typically implemented using circuit logic disposed on one or more physical integrated circuit devices, or chips. As such, memory 32 may be considered to include memory storage physically located elsewhere in the server 12, e.g., any cache memory in the at least one CPU 30, as well as any storage capacity used as a virtual memory, e.g., as stored on a mass storage device 34, another computing system (not shown), a network storage device (e.g., a tape drive) (not shown), or another network device (not shown) coupled to the server 12 through at least one network interface 36 (illustrated and referred to hereinafter as "network I/F" 36) by way of the communications network 18.

The server 12 may optionally (as indicated by dotted lines in FIG. 2) be coupled to at least one peripheral device through an input/output device interface 38 (illustrated as, and hereinafter, "I/O I/F" 38). In particular, the server 12 may receive data from a user through at least one user interface 40 (including, for example, a keyboard, mouse, a microphone, and/or other user interface) and/or outputs data to the user through at least one output device 42 (including, for example, a display, speakers, a printer, and/or another output device). Moreover, in various embodiments, the I/O I/F 38 communicates with a device that is operative as a user interface 40 and output device 42 in combination, such as a touch screen display (not shown).

The server 12 is typically under the control of an operating system 44 and executes or otherwise relies upon various computer software applications, sequences of operations, components, programs, files, objects, modules, etc., according to various embodiments of the present invention. In various embodiments, the server 12 executes or otherwise relies on one or more business logic applications 46 that are configured to provide a task message/task instruction to the mobile computing system 16. The task message/task instruction is communicated to the mobile computing system 16 for a user thereof (such as a warehouse worker) to execute a task that, for example, may involve travel to a specified location and/or slot (hereinafter, a "respective pick location") thereof in the area (e.g., warehouse 20) to perform a task in which a picking operation is involved. The one or more business logic applications 46 are also configured to store known unique identifiers (herein known also as a "unique identifier") in a database 48 within the mass storage 34.

Figure 3:
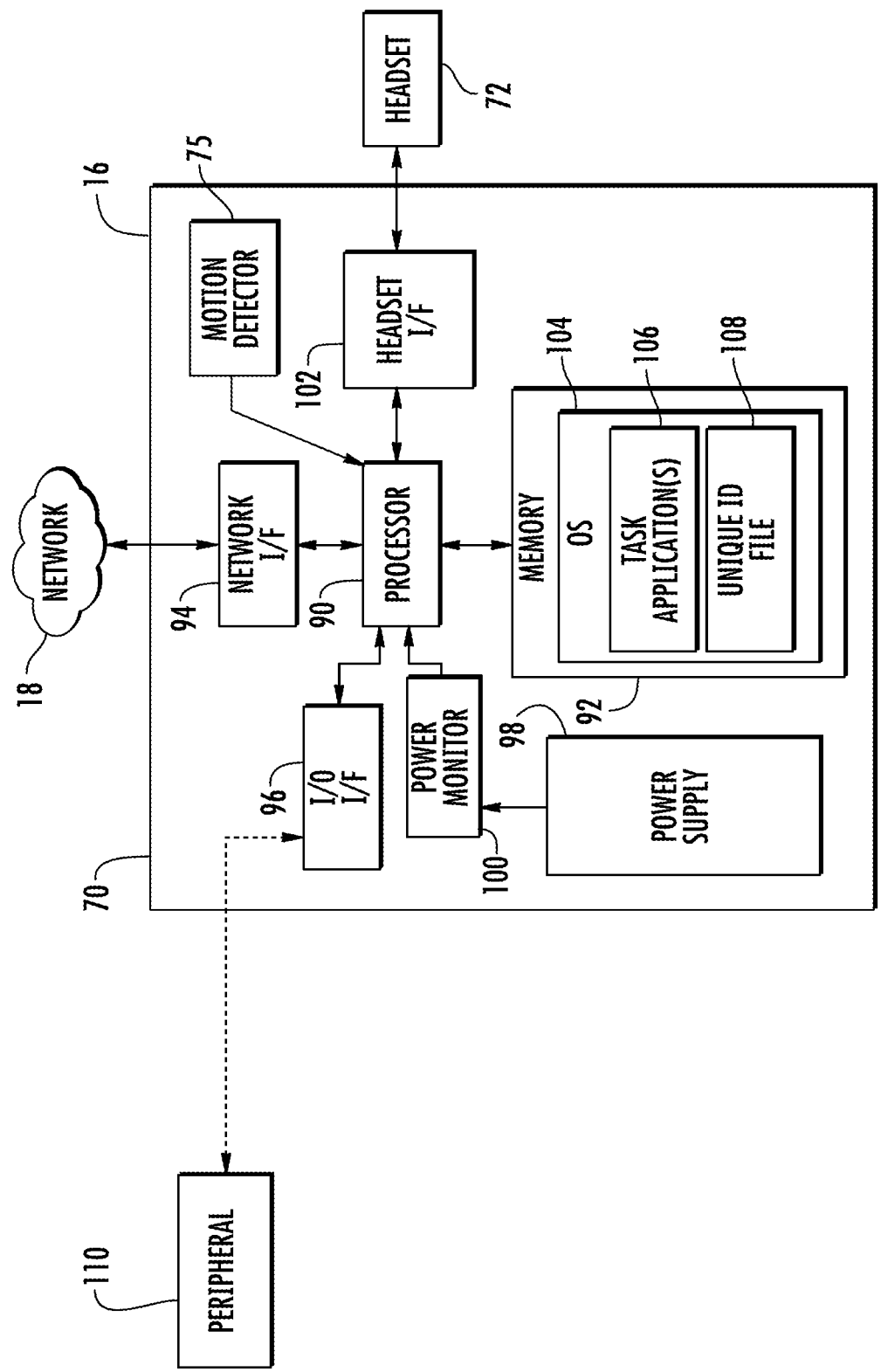
FIG. 3 is an illustration of the mobile computing system of the system of FIG. 1, depicting a mobile computing device and an exemplary headset that may be used by a worker to perform a picking operation, according to various embodiments.
Figure 4:
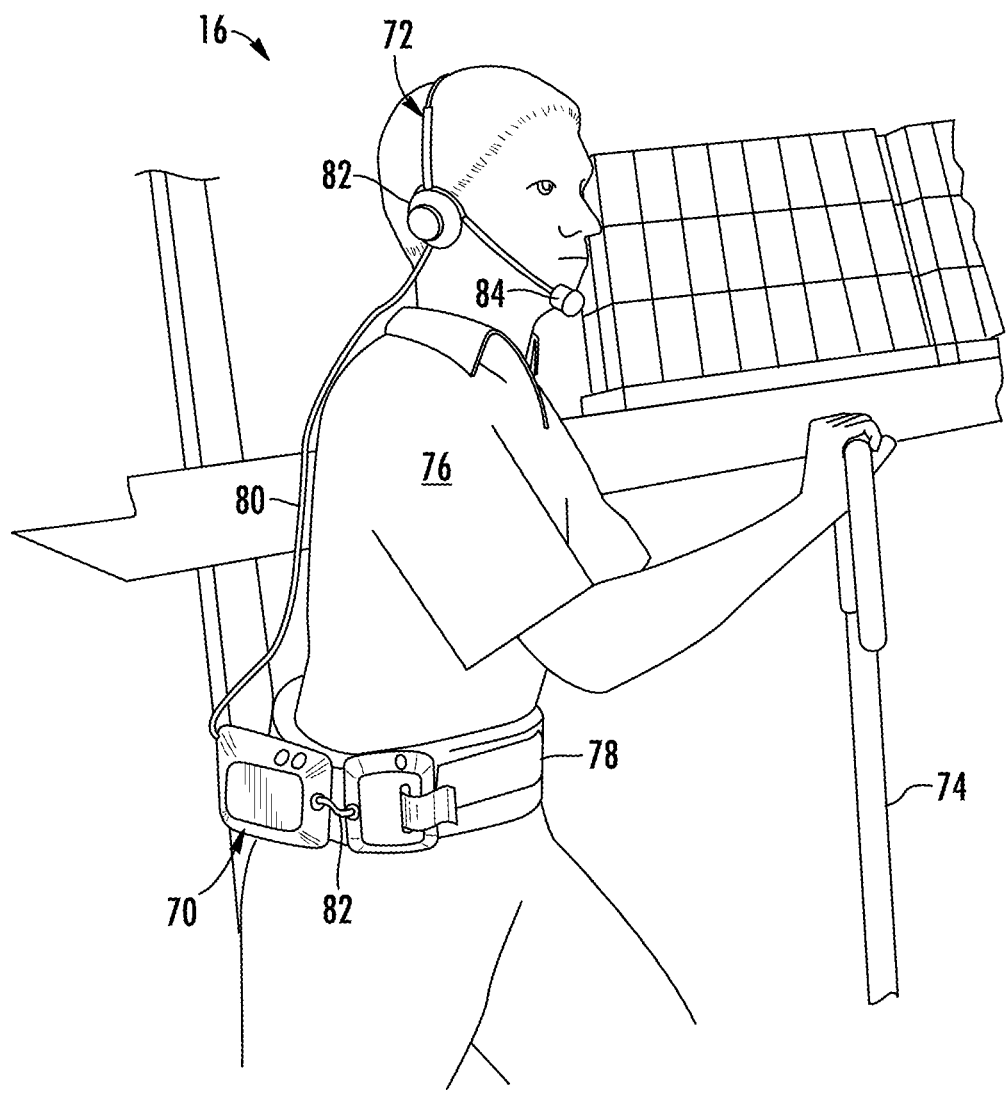
FIG. 4 is a diagrammatic illustration of hardware and software components of the mobile computing device and the headset of FIG. 3, according to various embodiments.

Referring again to FIG. 1 and now to FIGS. 3 and 4, according to various embodiments, the system for reducing picking operation errors comprises the mobile computing system 16 including a mobile computing device 70 in communication with the plurality of location beacons 22. The mobile computing system 16 may include the portable and/or wearable mobile computing device 70 worn by a user 76, for example, such as on a belt 78 as illustrated in the depicted embodiment of FIG. 4. In various embodiments, the mobile computing device may be carried or otherwise transported, on the vehicle 74 (FIG. 4) used in the picking operation.

According to various embodiments, FIG. 3 is a diagrammatic illustration of at least a portion of the components of the mobile computing device 70 according to various embodiments. The mobile computing device 70 comprises a memory 92 and a program code resident in the memory 92, a motion detector 75 for detecting vehicle motion information, and a processor 90 communicatively coupled to the memory 92 and the motion detector 75. The mobile computing device 70 further comprises a power supply 98, such as a battery, rechargeable battery, rectifier, and/or another power source.

The processor 90 of the mobile computing device 70 is typically implemented in hardware using circuit logic disposed in one or more physical integrated circuit devices, or chips. Each processor may be one or more microprocessors, micro-controllers, field programmable gate arrays, or ASICs, while memory may include RAM, DRAM, SRAM, flash memory, and/or another digital storage medium, and that is also typically implemented using circuit logic disposed in one or more physical integrated circuit devices, or chips. As such, memory is considered to include memory storage physically located elsewhere in the mobile computing device, e.g., any cache memory in the at least one processor, as well as any storage capacity used as a virtual memory, e.g., as stored on a mass storage device, a computer, and/or or another device coupled to the mobile computing device, including coupled to the mobile computing device through at least one network I/F 94 by way of the communications network 18. The mobile computing device 70, in turn, couples to the communications network 18 through the network I/F 94 with at least one wired and/or wireless connection.

Still referring to FIGS. 3 and 4, according to various embodiments, the mobile computing system 16 may further comprise a user input/output device, such as the headset 72. The headset 72 may be used, for example, in voice-enabled picking operations (such as pick to voice, etc.). In various embodiments, the user 76 may interface with the mobile computing device 70 (and the mobile computing device interfaces with the user 76) through the headset 72, which may be coupled to the mobile computing device 70 through a cord 80. In various embodiments, the headset 72 is a wireless headset and coupled to the mobile computing device through a wireless signal (not shown). The headset 72 may include one or more speakers 82 and one or more microphones 84. The speaker 82 is configured to play audio (e.g., such as speech output associated with a voice dialog to instruct the user 76 to perform an action), while the microphone 84 is configured to capture speech input from the user 76 (e.g., such as for conversion to machine readable input). As such, and in some embodiments, the user 76 interfaces with the mobile computing device 70 hands-free through the headset 72. The mobile computing device 70 is configured to communicate with the headset 72 through a headset interface 102 (illustrated as, and hereinafter, "headset I/F" 102), which is in turn configured to couple to the headset 72 through the cord 80 and/or wirelessly. In specific embodiments, the mobile computing device 70 may be coupled to the headset 72 through the BlueTooth® open wireless technology standard that is known in the art.

Referring now specifically to FIG. 3, in various embodiments, the mobile computing device 70 may additionally include at least one input/output interface 96 (illustrated as, and hereinafter, "I/O I/F" 96) configured to communicate with at least one peripheral 110 other than the headset 72. Exemplary peripherals may include a printer, a headset, an image scanner, an identification code reader (e.g., a barcode reader or an RFID reader), a monitor, a user interface (e.g., keyboard, keypad), an output device, a touch screen, to name a few. In various embodiments, the I/O I/F 96 includes at least one peripheral interface, including at least one of one or more serial, universal serial bus (USB), PC Card, VGA, HDMI, DVI, and/or other interfaces (e.g., for example, other computer, communicative, data, audio, and/or visual interfaces) (none shown). In various embodiments, the mobile computing device 70 may be communicatively coupled to the peripheral(s) 110 through a wired or wireless connection such as the BlueTooth® open wireless technology standard that is known in the art. The mobile computing device 70 may be under the control and/or otherwise rely upon various software applications, components, programs, files, objects, modules, etc. (herein the "program code" that is resident in memory 92) according to various embodiments of the present invention. This program code may include an operating system 104 (e.g., such as a Windows Embedded Compact operating system as distributed by Microsoft Corporation of Redmond, Wash.) as well as one or more software applications (e.g., configured to operate in an operating system or as "stand-alone" applications). As such, the memory 92 may also be configured with one or more task applications 106. The one or more task applications 106 process messages or task instructions for the user 76 (e.g., by displaying and/or converting the task messages or task instructions into speech output). The task applications 106 also generate the unique identifier and are configured to store the unique identifier associated with each of the location beacons 22 in a unique identifier file 108 within the memory 92. The task applications 106 can generate the unique identifier to identify a next pick location. The task applications 106 may be further configured to transmit at least a portion of the unique identifier to the server 12 to update the database 48 therein.

In various embodiments, a suitable mobile computing device 70 for implementing the present invention is a Talkman® wearable computing device available from Vocollect, Inc., of Pittsburgh, Pa. (USA). The mobile computing device 70 is utilized in the system 10, which may be a voice-enabled system, in conjunction with speech recognition technology for documentation and/or communication. The headset 72 provides hands-free voice communication between the user 76 and the mobile computing device 70.

For example, in various embodiments, the task application(s) 106 implement a dialog flow, such as for a pick-and-place, voice-assisted, or voice-directed operation. The task application(s) 106 communicate with the server 12 to receive task messages or task instructions. In turn, the task application(s) 106 may capture speech input for subsequent conversion to a useable digital format (e.g., machine readable input) by application(s) 46 the server 12 (e.g., to update the database 48 of the server 12). While a voice-enabled system has been described, it is to be understood that various embodiments may be used in any type of picking operation including those not involving a voice-enabled picking operation.

Still referring to FIG. 3, according to various embodiments, the motion detector 75 of the mobile computing device 70 may include any number of sensors or other appropriate devices that detect vehicle movement and transmit vehicle motion information to processor 90 of mobile computing device 70. Those having skill in the art will appreciate that any of a number of sensors may be utilized to detect vehicle movement including, but not limited to, an accelerometer, a GPS locator, gyroscope, compass, or some appropriate combination of a number of sensors or devices. The sensors also detect no vehicle movement, such as when the vehicle is stopped. As the term is used herein, "vehicle motion information" specifically embraces the concepts of actual motion and a vehicle not in motion (e.g., zero acceleration or "vehicle stoppage") for purposes as hereinafter described.

Figure 5:
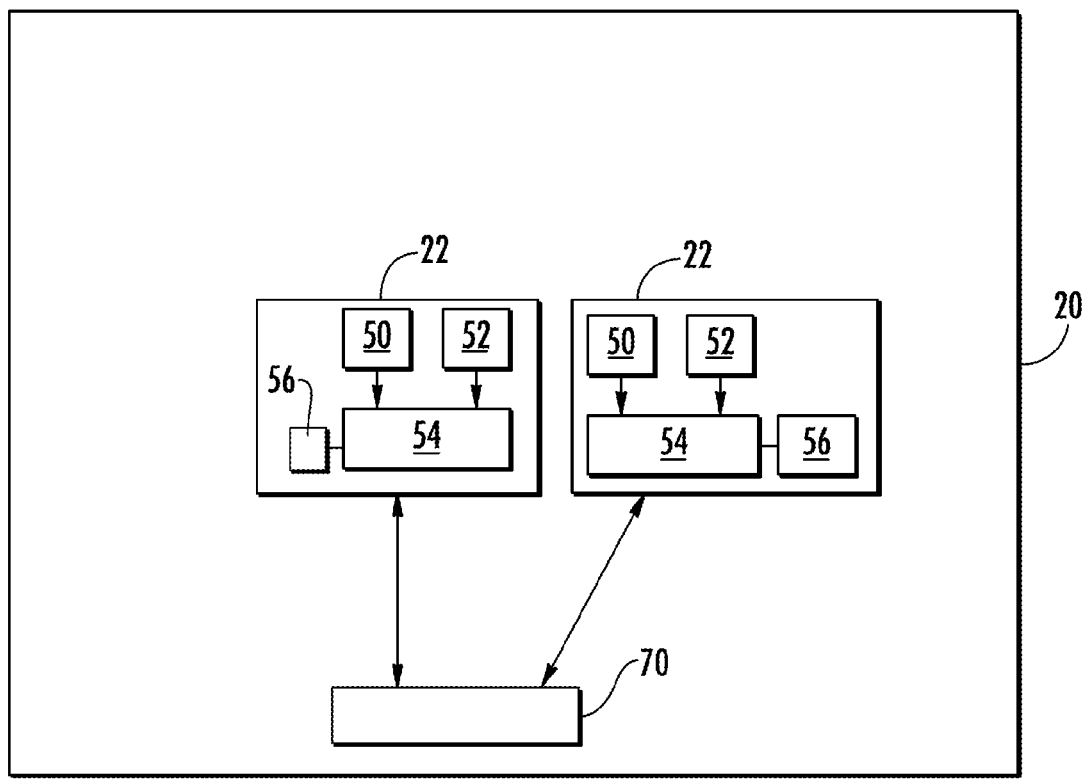
FIG. 5 is a diagrammatic illustration of hardware and software components of a location beacon of the system of FIG. 1, according to various embodiments.

Returning to FIG. 1 and now referring specifically to FIG. 5, according to various embodiments, each location beacon 22 is associated with a respective unique identifier and is configured to be positioned at a respective pick location within the area (e.g., within warehouse 20). The location beacon 22 is configured to transmit a unique identifier signal to the mobile computing device 70. The unique identifier signal represents the known unique identifier associated with a respective location beacon. The term "location beacon" refers to the fact that a particular beacon represents a particular location, in this case a pick location. The term "location beacon" is not limited to an indoor positioning beacon. While a "location beacon" positioned at each respective pick location has been described, it is to be understood that the term embraces other computing devices (e.g., a traditional pick to light system comprising a hard-wired display, light emitting diodes, etc.) that may be positioned at each respective pick location within an area and associated with a unique identifier that identifies a respective pick location. Accordingly, various embodiments embrace a computing device configured to transmit a known unique identifier signal associated with the respective pick location.

Still referring to FIG. 5, according to various embodiments, each location beacon 22 (an exemplary computing device) comprises a power supply 50, and a sensor 52 that is communicatively coupled to a beacon processor 54 that is coupled to a memory 56 that stores the unique identifier associated with the respective location beacon. The power supply 50 may be a battery, rechargeable battery, rectifier, and/or another power source. In accordance with various embodiments, the location beacon 22 (i.e., a computing device) may be a Radio Frequency (RF) beacon, a Bluetooth low energy (BLE) beacon, an ultra-wideband (UWB) beacon, or the like. Each location beacon broadcasts its advertisement packet (including its unique identifier) at a specified interval. The mobile computing device 70 (more particularly, the processor 90 thereof) monitors the unique identifier signals transmitted from each of the location beacons 22 (an exemplary computing device) until the processor of the mobile computing device 70 detects the unique identifier signal transmitted from the location beacon 22 positioned at the respective pick location comprising the correct pick location. The mobile computing device 70 then connects to the location beacon 22 positioned at the respective pick location comprising the correct pick location. The network interface 94 (Network I/F) in FIG. 3 may comprise a Wi-Fi radio and/or some other network interface and may be used to sense and communicate with the location beacons.

The sensor of each location beacon 22 is configured to measure an ambient magnetic field and to output a signal representing an ambient magnetic field measurement from which the magnetic field disruption may be detected. The sensor may be a magnetometer, reed switch, or the like. As noted previously, the vehicle 74 may be used to perform the task or order. Exemplary vehicles may comprise a truck, a forklift, a fork truck, a pallet jack, a crane, a dolly, a hand truck, and similar industrial vehicles (e.g., vehicles used in industrial operations, factory or warehouse settings, and the like). References in the disclosure to particular types of vehicles are not intended to limit the disclosure to particular vehicles. As most vehicles contain ferro-magnetic material due to the steel framing in vehicle design, their presence causes a perturbation or disturbance in the ambient magnetic field (a "magnetic field disruption"). The ambient magnetic field is normally constant over time, at a given location. When the vehicle containing the ferro-magnetic material moves to the respective pick location, the ambient magnetic field, at that location, is disrupted (changed). Thus, the sensor of each location beacon measures the change in the ambient magnetic field measurement at the respective location beacon. The sensor functions by measuring short duration perturbations (AC phenomenon) in the ambient magnetic field. At least one of the sensor and the mobile computing device is configured to detect the magnetic field disruption, i.e., the sensor may detect the magnetic field disruption from the ambient magnetic field measurement (by detecting, for example, a change in the ambient magnetic field measurement, etc.) and this information may be transmitted to the mobile computing device. The mobile computing device may, alternatively or additionally, detect the magnetic field disruption from the ambient magnetic field measurement. Thus, the location beacon 22 "senses" the ambient magnetic field measurement but the location beacon 22 and/or the mobile computing device 70 can qualify a disturbance in the magnetic field by monitoring the ambient magnetic field measurement readings that are sensed by the location beacon 22.

A magnetic field disruption at a location beacon 22 verifies that one or more vehicles are in the vicinity of the location beacon (more particularly, the sensor thereof). When the sensor does not sense an ambient magnetic field disruption, no vehicle is present in the vicinity of the location beacon. As used herein, the term "vicinity" comprises a detection zone of the sensor. The detection zone may be set by the sensitivity of the sensor. The sensor may output the signal to the mobile computing device 70 in accordance with a wired (LAN) or wireless technology. The wireless technology may be at least one of a Bluetooth protocol, a Wi-Fi protocol, or the like.

The magnetic field disruption may be detected in a number of ways. For example, in various embodiments, the magnetic field disturbance may be detected by a changing magnetic field measurement. The signal may represent the intensity of the ambient magnetic field measurement. The processor may be further configured to compare a baseline output signal stored by the processor that represents the ambient magnetic field measurement where no magnetic field disturbance is present to the signal to detect the presence of the magnetic field disturbance at the respective pick location comprising the correct pick location. The magnetic field disturbance may be detected when a threshold magnetic field measurement is reached Other ways of detecting the magnetic field disruption from the ambient magnetic field measurement are understood to be embraced by various embodiments of the present invention.

As in the noted previously, various embodiments utilize the magnetic field disruption to verify that the respective pick location at which one or more vehicles is present is the correct pick location. However, the magnetic field disruption cannot alone verify the respective pick location as the correct pick location as other vehicles in the vicinity of the sensor may cause a magnetic field disruption but may not be involved in the particular picking operation. Therefore, the motion detector 75 (FIG. 3) of the mobile computing device 70 further verifies the respective pick location as the correct pick location as hereinafter described.

The beacon processor 54 is typically implemented in hardware using circuit logic disposed on one or more physical integrated circuit devices or chips and may be one or more microprocessors, micro-controllers, FPGAs, or ASICs. Memory 56 may include RAM, DRAM, SRAM, flash memory, and/or another digital storage medium, and also typically implemented using circuit logic disposed on one or more physical integrated circuit devices, or chips.

Figure 6:
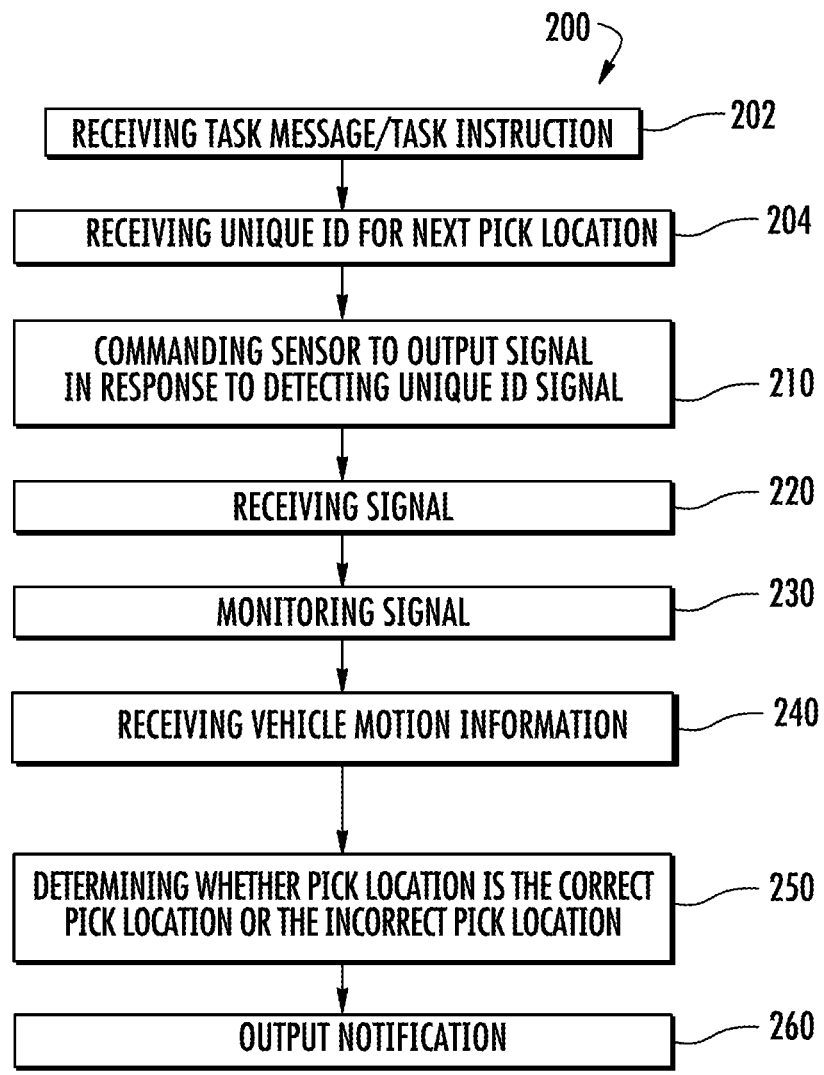
FIG. 6 is a flow diagram of a method for reducing picking operation errors, according to various embodiments.

FIG. 6 illustrates a method 200 for reducing picking operation errors, in accordance with various embodiments. The method 200 for reducing picking operation errors comprises receiving a task message or task instruction (step 202). The server 12 transmits task messages or task instructions to the mobile computing device 70 to perform the task or order (e.g., to pick an item at a particular pick location). The mobile computing device 70 receives the task messages or task instructions from the server 12.

The method 200 for reducing picking operation errors continues by receiving the unique identifier for the pick location (step 204). The processor 90 of the mobile computing device 70 is configured to receive the unique identifier (ID) for the pick location from the server 12. As noted previously, the mobile computing device 70 (more particularly, the processor 90 thereof) monitors the unique identifier signals transmitted from each of the location beacons 22 until the processor of the mobile computing device 70 detects the unique identifier signal transmitted from the location beacon 22 positioned at the respective pick location comprising the correct pick location. The processor is configured to detect the known unique identifier signal (step 205). The memory 92 of the mobile computing device 70 includes the program code enabling receipt of the transmitted unique identifier signals for the location beacons 22 while looking for the particular unique identifier signal (e.g., a BlueTooth® MAC address) associated with the correct pick location.

Still referring to FIG. 6, according to various embodiments, the method 200 for reducing picking operation errors comprises commanding the sensor of the location beacon (an exemplary computing device) to output the signal in response to detecting the unique identifier signal (step 210). The signal represents the ambient magnetic field measurement at the respective pick location. The processor 90 of the mobile computing device 70 is configured to command the sensor to output the signal in response to detecting the unique identifier signal associated with the correct (next) pick location.

Still referring to FIG. 6, according to various embodiments, the method 200 for reducing picking operation errors continues by receiving the signal representing the ambient magnetic field measurement from the sensor (step 220). The processor 90 of the mobile computing device is configured to receive the signal. The processor, in response to receiving the signal, monitors the signal to detect a change in the ambient magnetic field measurement (step 230). The processor of the mobile computing device may magnetically detect a magnetic field disturbance from the ambient magnetic field measurement. If the magnetic field disturbance is detected at the respective pick location, one or more vehicles are present in the vicinity of the respective pick location. If the ambient magnetic field measurement does not indicate a magnetic field disturbance, no vehicle 74 is deemed to be present in the vicinity of the respective pick location.

Still referring to FIG. 6, according to various embodiments, the method 200 for reducing picking operation errors continues by receiving vehicle motion information from the motion detector of the mobile computing device about the one or more vehicles at the respective pick location (step 240). The processor 90 of the mobile computing device 70 is configured to receive the vehicle motion information from the motion detector 75. As noted previously, the vehicle motion information may include information about vehicle stoppage or vehicle movement.

Still referring to FIG. 6, according to various embodiments, the method 200 for reducing picking operation errors continues by determining whether the pick location is the correct pick location or the incorrect pick location by correlating the ambient magnetic field measurement (more particularly, the magnetic field disturbance) with the vehicle motion information (step 250). More particularly, the processor 90 is configured to correlate the magnetic field disruption with vehicle stoppage at the respective pick location to further verify that the stopped vehicle is at the correct pick location. Thus, to further verify the respective pick location as the correct pick location, the processor 90 may monitor the signal from the sensor, looking for a significant change in the ambient magnetic field (i.e., the magnetic field disruption) as the vehicle approaches and stops at the respective pick location associated with the transmitted unique identifier. Any other vehicle(s) causing a magnetic field disturbance but not stopped is deemed to be a vehicle not assisting in performing the task or order in the picking operation.

Still referring to FIG. 6, according to various embodiments, the method 200 for reducing picking operation errors continues by processor of the mobile computing device 70 outputting a notification of whether the vehicle is at the correct pick location or the incorrect pick location (step 260). The notification may be sent to the user, the server, etc. As noted previously, if the ambient magnetic field measurement indicates a magnetic field disturbance at the (respective) pick location where the vehicle is located and the vehicle motion information indicates stoppage of the vehicle thereat, the vehicle is determined to be at the correct pick location. The vehicle is determined to be at the incorrect pick location if the ambient magnetic field measurement does not indicate a magnetic field disturbance at the pick location, if the vehicle motion information indicates movement of the vehicle at the pick location, or both.

The mobile computing device may send a signal to the server 12 that the mobile computing device 70 (and thus the vehicle 74 and user 76) are at the correct pick location corresponding to the unique identifier associated with the respective pick location comprising the correct pick location. The server 12 (more particularly, the business logic application thereof) then continues the task messages and task instructions that may include informing the user 76 of pick quantity and/or other information (i.e., the server resumes sending the task messages and task instructions)

If the respective pick location is not verified as the correct pick location (i.e., the vehicle is stopped at an incorrect pick location), the processor 90 may be further configured to generate and transmit to the user 76 an incorrect pick location alert. The alert may comprise an audible sound, a visual indication, or the like. Additionally, or alternatively, the business logic application may stop until the respective pick location is verified (e.g., the server may discontinue sending task messages and task instructions until a different respective pick location is verified as the correct pick location).

Figure 7:
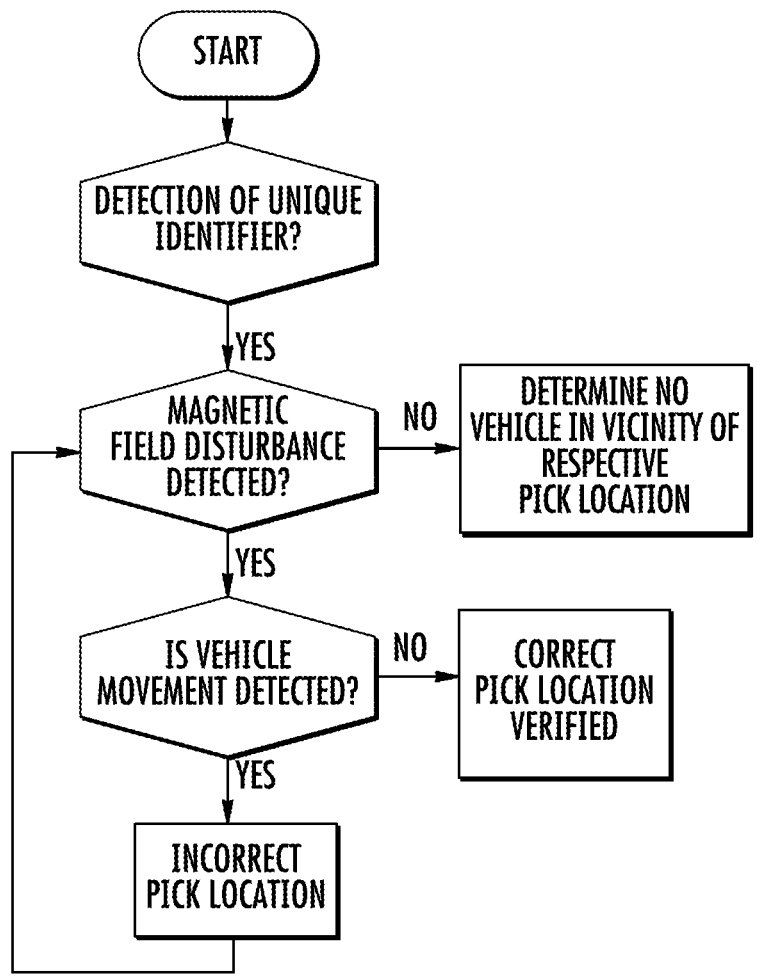
FIG. 7 is a flowchart illustrating a sequence of actions that may be executed by the processor of the mobile computing device to verify a respective pick location as a correct pick location, according to various embodiments.

FIG. 7 is a flowchart illustrating the sequence of actions that may be executed by the processor 90 of the mobile computing device 70 in performing method 200 for reducing picking operation errors by verifying a respective pick location as a correct pick location, according to various embodiments.

A person having ordinary skill in the art will recognize that the environments illustrated in FIGS. 1 through 5 are not intended to limit the scope of various embodiments of the present invention. In particular, the server 12, the mobile computing system 16, and/or the location beacon 22 may include fewer or additional components, or alternative configurations, consistent with alternative embodiments of the present invention. Thus, a person having skill in the art will recognize that other alternative hardware and/or software environments may be used without departing from the scope of the present. For example, a person having ordinary skill in the art will appreciate that the server 12, mobile computing system 16, and/or location beacon 22 may include more or fewer applications disposed therein. As such, other alternative hardware and software environments may be used without departing from the scope of embodiments of the present. Moreover, a person having ordinary skill in the art will appreciate that the terminology used to describe various pieces of data, task messages, task instructions, voice dialogs, speech output, speech input, and machine readable input are merely used for purposes of differentiation and are not intended to be limiting. The routines executed to implement the embodiments of the present invention, whether implemented as part of an operating system or a specific application, component, program, object, module or sequence of instructions executed by one or more computing systems will be referred to herein as a "sequence of operations," a "program product," or, more simply, "program code." The program code typically comprises one or more instructions that are resident at various times in various memory and storage devices in a computing system (e.g., the server 12 and/or mobile computing system 16), and that, when read and executed by one or more processors of the mobile computing system, cause that computing system to perform the steps necessary to execute steps, elements, and/or blocks embodying the various aspects of the present.

While the present invention has and hereinafter will be described in the context of fully functioning computing systems, those skilled in the art will appreciate that the various embodiments of the present are capable of being distributed as a program product in a variety of forms, and that the present applies equally regardless of the particular type of computer readable media used to actually carry out the distribution. Examples of computer readable media include but are not limited to physical and tangible recordable type media such as volatile and nonvolatile memory devices, floppy and other removable disks, hard disk drives, optical disks (e.g., CD-ROM's, DVD's, Blu-Ray disks, etc.), among others. In addition, various program code described hereinafter may be identified based upon the application or software component within which it is implemented in a specific embodiment of the present. However, it should be appreciated that any particular program nomenclature that follows is used merely for convenience, and thus the present should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the present is not limited to the specific organization and allocation of program functionality described herein.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;

U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;

U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. patent application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);

U.S. patent application Ser. No. 29/459,620 for an Electronic Device Enclosure, filed Jul. 2, 2013 (London et al.);

U.S. patent application Ser. No. 29/468,118 for an Electronic Device Case, filed Sep. 26, 2013 (Oberpriller et al.);

U.S. patent application Ser. No. 14/150,393 for Indicia-reader Having Unitary Construction Scanner, filed Jan. 8, 2014 (Colavito et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 29/486,759 for an Imaging Terminal, filed Apr. 2, 2014 (Oberpriller et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HAND-HELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HAND-HELD DIMENSIONER WITH DATA-QUALITY INDICATION filed Oct. 21, 2014 (Laffargue et al.);

U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, various embodiments of the present invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for reducing picking operation errors, the method comprising:
receiving a task instruction about an item to be picked during a picking operation;
receiving a unique identifier (ID) for a pick location where the item to be picked is located;
detecting a unique identifier signal representing the unique identifier from a computing device at the pick location;
commanding a sensor of the computing device to output a signal in response to detecting the unique identifier signal, the signal representative of an ambient magnetic field measurement in a vicinity of the sensor;
receiving the signal outputted from the sensor;
monitoring the signal to detect a change in the ambient magnetic field measurement;
receiving vehicle motion information from a motion detector about a vehicle in the vicinity of the sensor;
determining whether the vehicle is at a correct pick location comprising the pick location where the item is located or at an incorrect pick location; and
outputting a notification of whether the vehicle is at the correct pick location or the incorrect pick location,
wherein if the ambient magnetic field measurement indicates a magnetic field disturbance at the pick location where the vehicle is located and the vehicle motion information indicates stoppage of the vehicle thereat, the vehicle is determined to be at the correct pick location; and
wherein the vehicle is determined to be at the incorrect pick location if the ambient magnetic field measurement does not indicate a magnetic field disturbance at the pick location, if the vehicle motion information indicates movement of the vehicle at the pick location, or both.

2. The method according to claim 1, further comprising detecting the magnetic field disturbance from the ambient magnetic field measurement.

3. The method according to claim 1, further comprising, prior to detecting the unique identifier signal, monitoring each computing device of a plurality of computing devices for the unique identifier signal, each computing device and sensor associated with a respective pick location.

4. A method for reducing picking operation errors, the method comprising:
receiving a signal from a sensor associated with a pick location of a plurality of pick locations, the signal representative of an ambient magnetic field measurement in a vicinity of the sensor;
monitoring the signal to detect a change in the ambient magnetic field measurement;
receiving vehicle motion information from a motion detector about a vehicle in the vicinity of the sensor; and determining that the vehicle is at a correct pick location comprising the pick location or an incorrect pick location by correlating the ambient magnetic field measurement with the vehicle motion information; and outputting a notification of whether the vehicle is at the correct pick location or the incorrect pick location.

5. The method according to claim 4, wherein if the ambient magnetic field measurement indicates a magnetic field disturbance at the pick location and the vehicle motion information indicates stoppage of the vehicle thereat, the vehicle is determined to be at the correct pick location.

6. The method according to claim 4, wherein if the ambient magnetic field measurement does not indicate a magnetic field disturbance at the pick location, if the vehicle motion information indicates movement of the vehicle at the pick location, or both, the vehicle is determined to be at the incorrect pick location.

7. The method according to claim 4, further comprising, prior to receiving the signal:

receiving a task instruction for performing a task;

receiving a unique identifier (ID) for the pick location where the task is to be performed; monitoring the plurality of pick locations for a unique identifier signal representing the unique identifier; and detecting the unique identifier signal.

8. The method according to claim 4, further comprising detecting the magnetic field disturbance from the ambient magnetic field measurement.

9. The method according to claim 8, wherein the signal represents the intensity of the ambient magnetic field measurement and detecting the magnetic field disturbance from the ambient magnetic field measurement comprises comparing a baseline signal that represents the ambient magnetic field measurement where no magnetic field disturbance is present to the signal to detect the presence of the magnetic field disturbance at the pick location.

10. A system for reducing picking operation errors, the system comprising:

a computing device positioned at a respective pick location and configured to transmit a unique identifier signal associated with the respective pick location, the computing device comprising a sensor configured to measure an ambient magnetic field and to output a signal representing an ambient magnetic field measurement from which a magnetic field disruption is configured to be detected;

a mobile computing device in communication with the computing device, the mobile computing device comprising:

a memory and a program code resident in the memory;

a motion detector for sensing vehicle motion information about a vehicle in a vicinity of the sensor; and a processor communicatively coupled to the memory and the motion detector, the processor configured by at least a portion of the program code to:

receive a task instruction about a task to be performed at the respective pick location;

receive a unique identifier (ID) for the respective pick location;

detect the unique identifier signal representing the unique identifier;

command the sensor of the computing device to output the signal in response to detecting the unique identifier signal;

receive the signal from the sensor;

monitor the signal to detect a change in the ambient magnetic field measurement;

receive the vehicle motion information from the motion detector;

determine whether the vehicle is at a correct pick location comprising the respective pick location where a task is to be performed or an incorrect pick location by correlating the ambient magnetic field measurement with the vehicle motion information, wherein if the ambient magnetic field measurement indicates the magnetic field disturbance at the respective pick location and the vehicle motion information indicates stoppage of the vehicle thereat, the respective pick location is determined to be the correct pick location; and output a notification of whether the vehicle is at the correct pick location or the incorrect pick location.

11. The system according to claim 10, wherein at least one of the computing device and the mobile computing device is configured to detect the magnetic field disruption caused by the presence of the vehicle in the vicinity of the sensor.

12. The system according to claim 10, wherein the signal represents the intensity of the ambient magnetic field measurement, the processor further configured to compare a baseline signal stored by the processor that represents the ambient magnetic field measurement where no magnetic field disturbance is present to the signal to detect the presence of the magnetic field disturbance at the respective pick location.

13. The system according to claim 10, wherein the respective pick location is determined to be the incorrect pick location if the ambient magnetic field measurement does not indicate a magnetic field disturbance at the respective pick location, if the vehicle motion information indicates movement of the vehicle at the respective pick location, or both.

14. The system according to claim 13, wherein the processor is further configured to generate and transmit an incorrect pick location alert if the respective pick location is determined to be the incorrect pick location.

15. The system according to claim 10, wherein the mobile computing device is in communication with a server, the processor configured to output the notification to the server.

16. The system according to claim 15, wherein if the respective pick location is determined to be the correct pick location, the server transmits a next task instruction to the mobile computing device.

17. The system according to claim 10, wherein if the respective pick location is determined to be the incorrect pick location, the server discontinues sending task instructions to the mobile computing device until a different respective pick location is determined to be the correct pick location.

18. The system according to claim 10, wherein the computing device transmits the unique identifier signal and the signal in accordance with at least one of a Bluetooth protocol and a Wi-Fi protocol.

19. The system according to claim 10, wherein the computing device comprises a location beacon of a plurality of location beacons.

20. The system according to claim 19, wherein the location beacon comprises a Bluetooth Low Energy (BLE) beacon, a radio frequency (RF) beacon, or an ultra-wideband UWB) beacon.

* * * * *